United States Patent [19]
Young

[11] Patent Number: 5,714,856
[45] Date of Patent: Feb. 3, 1998

[54] CONTROL METHOD FOR PROPULSION BATTERY REGENERATION IN AN ELECTRIC VEHICLE

[75] Inventor: Ronald W. Young, Whittier, Calif.

[73] Assignee: Delco Electronics Corporation, Kokomo, Ind.

[21] Appl. No.: 695,815

[22] Filed: Aug. 5, 1996

[51] Int. Cl.$^6$ .................... H02P 7/00; B60K 1/02
[52] U.S. Cl. .................... 318/376; 318/370; 318/139; 180/65.1; 364/424.02
[58] Field of Search .................... 318/138, 139, 318/370–389, 719; 364/424.01, 424.02, 424.05, 424.06; 180/65.3, 65.1; 303/3, 15, 20, 112, 101, 100, 10; 188/156, 158, 181 T, 159; 322/11, 12, 13, 18

[56] References Cited

U.S. PATENT DOCUMENTS

| | | | |
|---|---|---|---|
| 4,928,227 | 5/1990 | Burba et al. | 318/12 |
| 5,366,281 | 11/1994 | Littlejohn | 303/3 |
| 5,378,053 | 1/1995 | Patient et al. | 303/3 |
| 5,399,000 | 3/1995 | Aoki et al. | 303/3 |
| 5,476,310 | 12/1995 | Ohtsu et al. | 303/3 |
| 5,492,192 | 2/1996 | Brooks et al. | 180/165 |
| 5,549,172 | 8/1996 | Mutoh et al. | 180/65.1 |
| 5,578,911 | 11/1996 | Carter et al. | 318/376 |
| 5,583,406 | 12/1996 | Mutoh et al. | 318/376 |
| 5,583,411 | 12/1996 | Kusano et al. | 318/719 |
| 5,608,308 | 3/1997 | Kiuchi et al. | 318/139 |
| 5,614,803 | 3/1997 | Morioka et al. | 318/801 |
| 5,614,809 | 3/1997 | Kiuchi et al. | 322/11 |
| 5,621,304 | 4/1997 | Kiuchi et al. | 322/18 |

*Primary Examiner*—Paul Ip
*Attorney, Agent, or Firm*—Mark A. Navarre

[57] ABSTRACT

A system and methods that provide for battery regeneration in electric vehicles without employing brake blending. Wheel speed sensors provide speed inputs to a controller, for example, that are processed to control the torque commands issued to a motor of the vehicle, which allows a higher level of battery regeneration without causing drive wheels to lock up. In the present invention, speed inputs derived from the wheel speed sensors are sampled. The absolute value of the difference between the input signals derived from the wheel speed sensors is compared to a predetermined difference threshold. If the absolute value of the difference between the input signals is less than the predetermined difference threshold, a regeneration torque command is generated to control the torque output of the motor that is equal to a current value of the regeneration torque command. If the absolute value of the difference between the input signals is greater than or equal to the predetermined difference threshold, a regeneration torque command is generated that is equal to the current value of the regeneration torque command times a reduction scale factor, to reduce the amount of battery regeneration to a level that does not lock up the wheels.

8 Claims, 2 Drawing Sheets

CONTROL METHOD FOR PROPULSION BATTERY REGENERATION IN AN ELECTRIC VEHICLE

BACKGROUND

The present invention relates generally to electric vehicles, and more particularly, to a system and method that implements battery regeneration in electric vehicles without employing brake blending.

The assignee of the present invention designs and builds control systems for use in electric vehicles, such as for controlling the speed of a motor of an electric vehicle and braking of the electric vehicle, for example. Battery regeneration is performed in the electric vehicles which uses the motor as a generator to return power to the battery and as such generates negative torque. This negative torque slows the drive wheels down and can actually cause them to lock up, thus limiting operator control of the vehicle.

Prior efforts by the assignee of the present invention to control battery regeneration levels have been accomplished using two methods. In the first method, the battery regeneration level is controlled by an on-vehicle antilock brake system (ABS) controller which had been optimized for electric vehicle use. In the second method, the battery regeneration level was controlled via a multiposition switch in combination with battery pack voltage. The first method requires an ABS controller that constantly monitors wheel speed sensor inputs, and not just during a braking event. The second method allows battery regeneration levels that can cause wheel lock up.

It would therefore be an improvement in the art to have a control apparatus and methods that allow high levels of battery regeneration and also minimize wheel lock up by reducing the battery regeneration level. It would a further improvement in the art to have a control apparatus and methods that permit a vehicle to be converted to electric propulsion without major changes to other on-board systems.

Accordingly, it is an objective of the present invention to provide for a system and method that implements battery regeneration in electric vehicles without employing brake blending.

SUMMARY OF THE INVENTION

To meet the above and other objectives, the present invention provides for a system and methods that may be implemented in a controller, for example, that provides for battery regeneration in electric vehicles without employing brake blending. By adding wheel speed sensor inputs to the power inverter, a higher level of regeneration can be provided without causing drive wheels to lock up. Previous systems have required the ABS controller to perform control the regeneration level. The invention does not require the vehicle to have an on-board ABS system, or if it has one, the ABS controller is not required to be active during non-braking events.

The invention thus provides for a system and methods (algorithms) that monitor wheel speed sensor inputs and uses the sensed wheel speed inputs to control the battery regeneration level in addition to a battery pack voltage limit. The approach of the present invention allows higher levels of battery regeneration to be achieved in vehicles without antilock brake system (ABS) controllers or during non-brake pedal depressed events for those vehicles with ABS.

By monitoring wheel speed sensors, the controller can reduce the regeneration level to a level that does not lock up the wheels. This allows more energy to be resumed to the battery pack than an uncontrolled regeneration system which must have a lower regeneration power limit set to prevent the wheels from locking up. The amount of energy returned to the batteries translates into driving range for the vehicle. The present algorithm works with two, three, or four wheel speed sensor inputs. A flow chart of the algorithm is attached.

The wheel speed sensor inputs are added to the controller which allows higher levels of battery regeneration to be generated while limiting the chances of wheel lock up. This allow vehicles without ABS systems, or those with ABS systems that do not monitor wheel speed unless the brake pedal are depressed, to safely achieve much higher levels of battery regeneration.

This invention is useable in any product using an electric motor and inverter. The addition of this feature should allow the use of higher regeneration levels thus increasing range of the electric vehicle in which it is employed. The invention is of most use to conversion vehicles that do not have ABS systems optimized for electric vehicle usage.

The advantage of the present invention is that it allows high levels of battery regeneration and also minimizes wheel lock up by reducing the battery regeneration level. This permits a non-electric vehicle to be converted to electric propulsion without major changes to other on board systems.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
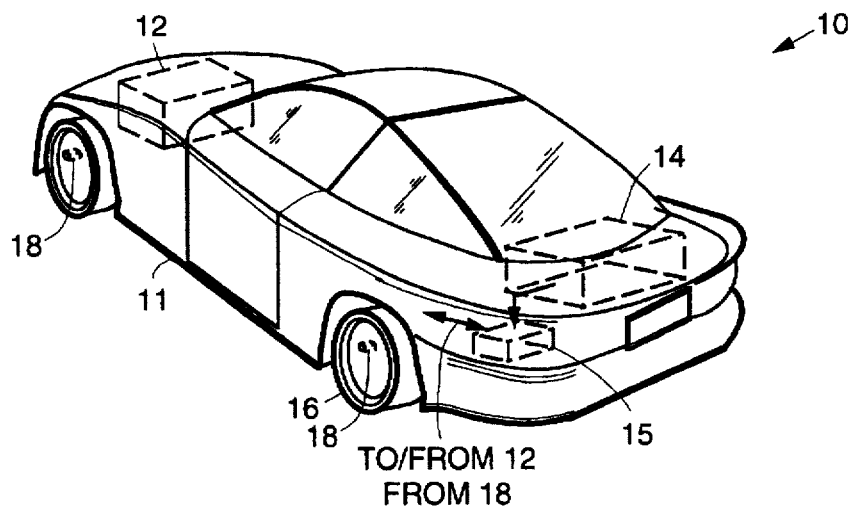
FIG. 1 shows an electric vehicle employing a controller that implements battery regeneration without brake blending in accordance with the principles of the present invention.

Referring to the drawing figures, FIG. 1 shows an electric vehicle 10 employing a controller 15 that implements battery regeneration methods 20 (or algorithms 20) without brake blending in accordance with the principles of the present invention. The electric vehicle 11 comprises an electric drive motor 12 that is powered by electric propulsion batteries 14 under control of the controller 15 that comprises controller 15 employed by the present invention. The motor 12 is coupled to drive wheels 16 whose rotation is monitored using rotor or wheel sensors 18. The rotor or wheel speed sensors 18 are coupled to the controller 15. The controller 15 processes speed inputs derived from the rotor or wheel speed sensors 18.

The present invention provides for methods 20 or algorithms 20 that monitor wheel speed inputs from the wheel speed sensors 17 and use the sensed wheel speeds to control the regeneration level of the propulsion batteries 14 of the vehicle 11 and limit the voltage level of the batteries. The approach of the present invention allows higher levels of battery regeneration to be achieved in electric vehicles 11 that do not employ antilock brake system (ABS) controllers, or during non-brake pedal depressed events for those vehicles 11 with ABS controllers.

Battery regeneration in the electric vehicle 11 uses the motor 12 as a generator to return power to the batteries 14 and as such generates negative torque. This negative torque slows the drive wheels 16 down and can cause them to lock up, thus limiting the control of the vehicle 11. Brake blending is a process that combines the amount of regenerative braking and the normal hydraulic braking system on an electric vehicle 11 to maximize the amount of regeneration energy available while maintaining a consistent "feel" on the brake pedal. It is highly desirable that the brake pedal "feel" be consistent each and every time an operator uses it. Since the amount of regeneration braking that is available depends upon the speed of the vehicle and the voltage of the battery 14, the amount of regenerative braking that is available varies as a function of these parameters. The controller 15 provides a brake controller (not shown) with feedback signals indicative of the amount of regenerative braking energy that is being provided and the braking controller then "blends" the hydraulic braking force with the effects of the regenerative braking to provide a consistent feel to the operator.

In accordance with the present invention, by monitoring the wheel speed sensors 18, the controller 15 can reduce the amount of battery regeneration to a level that does not lock up the wheels 16. This allows more energy to be resumed to the batteries than an uncontrolled regeneration system which must have a lower regeneration power limit set to prevent the wheels 16 from locking up. The amount of energy returned to the batteries 14 translates into a driving range for the vehicle 11. The present algorithms 20 or methods 20 may be employed with inputs from two, three, or four wheel speed sensors 18.

Figure 2:
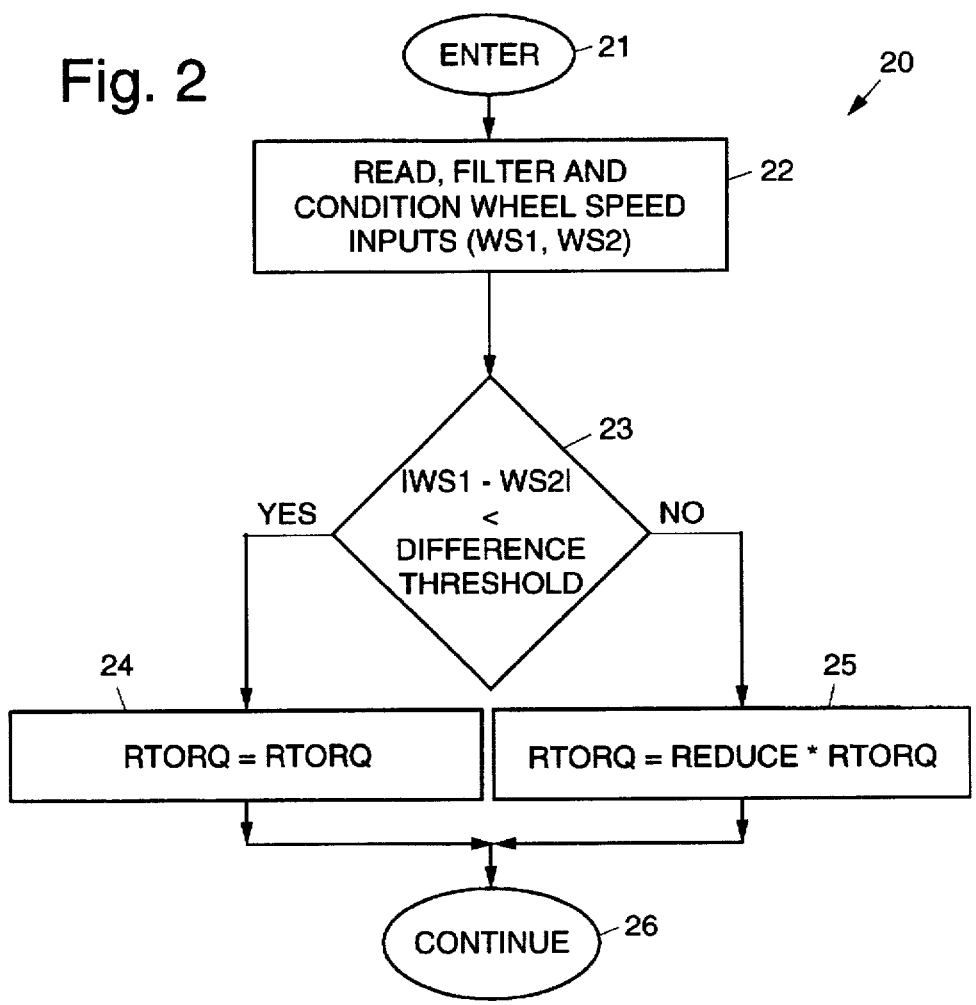
FIG. 2 shows a flow chart is detailing a first embodiment of a regeneration method in accordance with the present invention for use with two wheel speed sensor inputs.

Referring now to FIG. 2, it shows a flow chart is detailing a first embodiment of a regeneration method 20 for use with inputs from two wheel speed sensors 18. In the first embodiment of the method 20, the method starts (step 21) and then samples or otherwise reads, filters and conditions wheel speed input signals from first and second wheel speed sensors 18 (step 22). Then, the absolute value of the difference between the input signals (WS1, WS2) derived from the first and second wheel speed sensors 18, respectively, is compared to a predetermined difference threshold (step 23).

If the absolute value of the difference between the input signals (WS1, WS2) is less than the predetermined difference threshold, then a regeneration torque command (RTORQ) is issued to control the torque output of the motor 12 that is equal to the current value (RTORQ) of the regeneration torque command (step 24) and the method 20 continues by sampling the wheel speed input signals in step 22. However, if the absolute value of the difference between the input signals (WS1, WS2) is greater than or equal to the predetermined difference threshold, then a regeneration torque command (RTORQ) is issued that is equal to the current value (RTORQ) of the regeneration torque command times a reduction scale factor (REDUCE) (step 25). Thereafter, the method 20 continues by sampling the wheel speed input signals in step 22.

Figure 3:
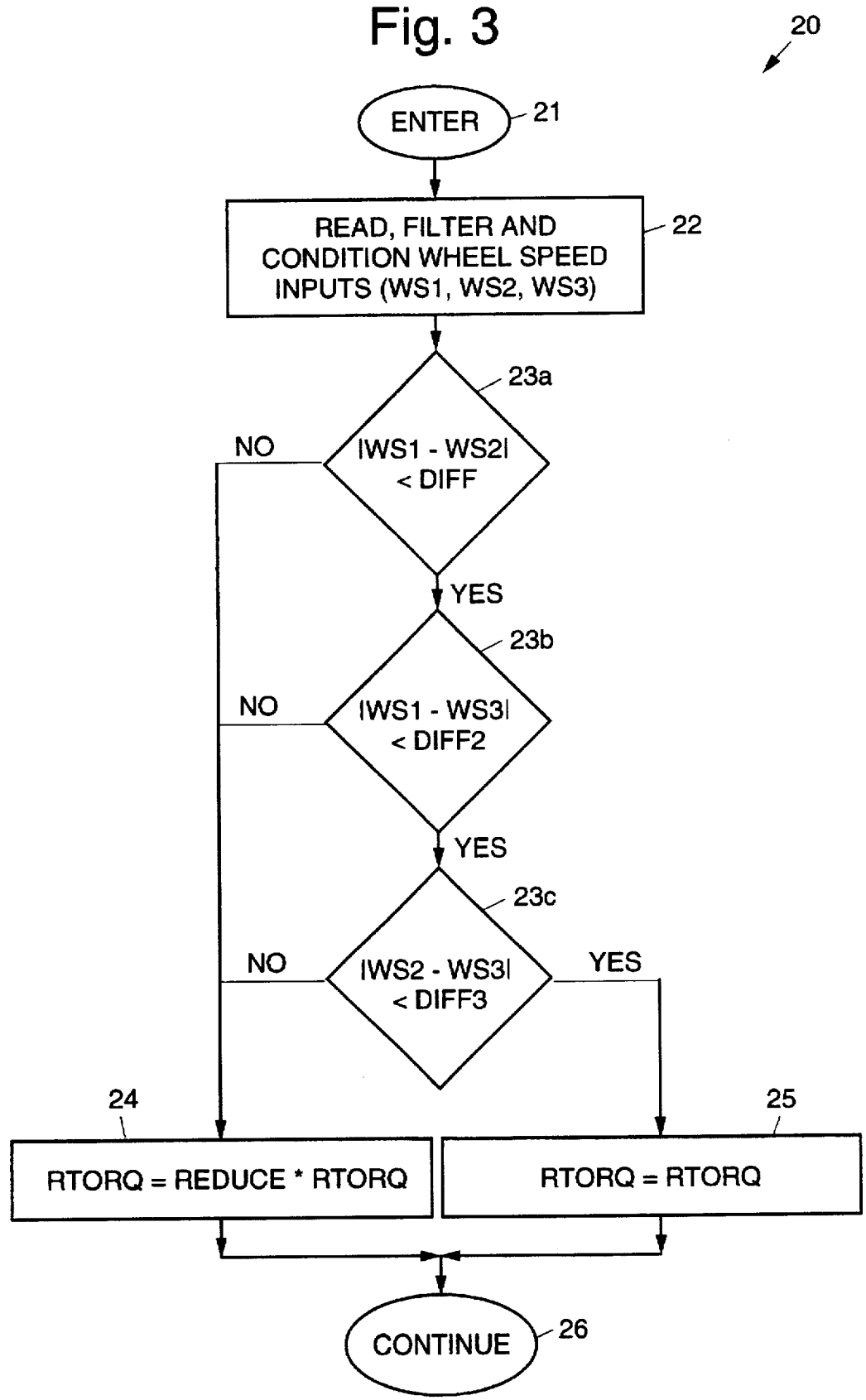
FIG. 3 shows a flow chart is detailing a second embodiment of a regeneration method in accordance with the present invention for use with three wheel speed sensor inputs.

FIG. 3 shows a flow chart is detailing a second embodiment of a regeneration method 20 for use with three wheel speed sensor inputs. The second method is substantially the same as the first embodiment, but uses sensed inputs from additional wheel sensors 18. Three wheel sensor inputs are processed in the embodiment of FIG. 3, but up to four may readily be monitored in a similar manner as is depicted and described.

In the second embodiment of the method 20, the method starts (step 21) and reads, filters and conditions wheel speed input signals from first, second and third wheel speed sensors 18 (step 22). Then, the absolute value of the difference between the input signals (WS1, WS2) derived from the first and second wheel speed sensors 18, respectively, (a first pair of wheel speed sensors 18) is compared to a first predetermined difference value given by DIFF1 (step 23a).

If the absolute value of the difference between the input signals (WS1, WS2) is less than the predetermined difference value, then the absolute value of the difference between the input signals (WS1, WS3) derived from the first and third wheel speed sensors 18, respectively, (a second pair of wheel speed sensors 18) is compared to a second predetermined difference value given by DIFF2 (step 23b). If the absolute value of the difference between the input signals (WS1, WS3) is less than the predetermined difference value, then the absolute value of the difference between the input signals (WS2, WS3) derived from the second and third wheel speed sensors 18, respectively, (a third pair of wheel speed sensors 18) is compared to a third predetermined difference value given by DIFF3 (step 23c). The first, second and third predetermined difference values may be different for each pair of wheel sensors 18. Typically, WS3, and WS4 if a fourth wheel speed is sensed, is (are) a non-drive wheel input and may be the average of both non-drive wheel inputs, for example.

If the absolute value of the difference between the input signals (WS2, WS3) is less than the predetermined difference value, then a regeneration torque command (RTORQ) is issued that is equal to the current value (RTORQ) of the regeneration torque command (step 24) and the method 20 continues by sampling the wheel speed input signals in step 22. However, if the absolute value of the difference between any of the pairs of input signals (WS1, WS2; WS1, WS3; or WS2, WS3) is greater than or equal to any of the respective predetermined difference values, then a regeneration torque command (RTORQ) is issued that is equal to the current value (RTORQ) of the regeneration torque command times a reduction scale factor (REDUCE) (step 25). Thus, each of the respective comparisons in steps 23a, 23b and 23c is used to reduce the torque command issued by the controller 15 to the motor 12. Thereafter, the method 20 continues by sampling the wheel speed input signals in step 22.

For the purposes of completeness, in FIGS. 2 and 3, WS1 is the wheel speed input from the first wheel speed sensor 18, WS2 is the wheel speed input from the second wheel speed sensor 18, and WS3 is the wheel speed input from the second wheel speed sensor 18. DIFF1 is the difference between wheel speeds derived from the first pair of sensors 18, DIFF2 is the difference between wheel speeds derived from the second pair of sensors 18, and DIFF3 is the difference between wheel speeds derived from the third pair of sensors 18. RTORQ is the regeneration torque command that is issued by the controller 15 to control the torque output of the motor 12. REDUCE is a reduction scale factor that is multiplied by the regeneration torque command RTORQ to control the torque output of the motor 12.

Thus, a system and methods that implement battery regeneration in electric vehicles without employing brake blending have been disclosed. It is to be understood that the above-described embodiments are merely illustrative of some of the many specific embodiments which represent applications of the principles of the present invention. Clearly, numerous and varied other arrangements may be readily devised by those skilled in the art without departing from the scope of the invention.

The embodiments of the invention in which an exclusive property or privilege is claimed are defined as follows:

1. A regeneration control method for an electric vehicle having a plurality of drive wheels, an electric drive motor coupled to the drive wheels, propulsion batteries coupled to the drive motor, and a controller that generates a regeneration torque command for the motor, the control method comprising the steps of:

measuring the speeds of said drive wheels;

comparing the absolute value of a difference between the measured speeds to a predetermined difference threshold, if the absolute value of said difference is less than the predetermined difference threshold, generating a regeneration torque command that is equal to a current value of the regeneration torque command, and if the absolute value of said difference is greater than or equal to the predetermined difference threshold, generating a regeneration torque command that is equal to the current value of the regeneration torque command times a reduction scale factor, to reduce the amount of battery regeneration to a level that does not lock up the drive wheels.

2. The method of claim 1 wherein the step of measuring the speeds of said drive wheels comprises reading, filtering and conditioning wheel speed input signals derived from a plurality of wheel speed sensors coupled to said drive wheels.

3. The method of claim 1 further comprising the steps of:

measuring the speeds of first, second and third pairs of said drive wheels;

comparing the absolute value of a first difference between the measured speeds of the first pair of drive wheels to a first predetermined difference value, and if the absolute value of said first difference is less than a first predetermined difference value, then comparing the absolute value of a second difference between the measured speeds of the second pair of drive wheels to a second predetermined difference value, and if the absolute value of said second difference is less than the second predetermined difference value, then comparing the absolute value of a third difference between the measured speeds of the third pair of drive wheels to a third predetermined difference value, and if the absolute value of said third difference is less than the third predetermined difference value, generating a regeneration torque command that is equal to the current value of the regeneration torque command, and if the absolute value of any of said first, second and third differences is greater than or equal to the respective first, second and third predetermined difference values, generating a regeneration torque command that is equal to the current value of the regeneration torque command times the reduction scale factor.

4. The method of claim 3 wherein the first, second and third predetermined difference values are different for each pair of drive wheels.

5. The method of claim 3 wherein the electric vehicle has non-drive wheels, and wherein the measured wheel speeds include an average of the speeds of said non-drive wheels.

6. A regeneration control method for an electric vehicle having a plurality of drive wheels, an electric drive motor coupled to the drive wheels, propulsion batteries coupled to the drive motor, and a controller that generates a regeneration torque command for the motor, and a plurality of wheel speed sensors coupled to the drive wheels, said control method comprising the steps of:

sampling speed inputs derived from respective pairs of a plurality of pairs of wheel speed sensors;

comparing the absolute value of the difference between a first pair of input signals derived from a first pair of wheel speed sensors to a first predetermined difference value, and if this first absolute value is less than a first predetermined difference value, then comparing the absolute value of the difference between the input signals derived from a second pair of wheel speed sensors to a second predetermined difference value, and if this second absolute value is less than the second predetermined difference value, then comparing the absolute value of the difference between the input signals derived from a third pair of wheel speed sensors to a third predetermined difference value, and if this third absolute value is less than the third predetermined difference value, then generating a regeneration torque command that is equal to the current value of the regeneration torque command, and if the absolute value of the difference between any of the pairs of input signals is greater than or equal to any of the respective predetermined difference values, then generating a regeneration torque command that is equal to the current value of the regeneration torque command times a reduction scale factor.

7. The method of claim 6 wherein the first, second and third predetermined difference values are different for each pair of wheel sensors.

8. The method of claim 7 wherein the electric vehicle has non-drive wheels and wheel speed sensors coupled to said non-drive wheels, and input signals derived from wheel speed sensors coupled to said non-drive wheels comprise an average of these input signals.

* * * * *